United States Patent
Griffith

(10) Patent No.: US 11,232,626 B2
(45) Date of Patent: Jan. 25, 2022

(54) SYSTEM, METHOD AND APPARATUS FOR MEDIA PRE-VISUALIZATION

(71) Applicant: Twentieth Century Fox Film Corporation, Los Angeles, CA (US)

(72) Inventor: John M. Griffith, Los Angeles, CA (US)

(73) Assignee: Twenieth Century Fox Film Corporation, Los Angeles, CA (US)

( * ) Notice: Subject to any disclaimer, the term of this patent is extended or adjusted under 35 U.S.C. 154(b) by 0 days.

(21) Appl. No.: 15/704,043

(22) Filed: Sep. 14, 2017

(65) Prior Publication Data
US 2018/0005430 A1    Jan. 4, 2018

Related U.S. Application Data

(63) Continuation-in-part of application No. 13/466,522, filed on May 8, 2012, now Pat. No. 9,799,136.
(Continued)

(51) Int. Cl.
*G06T 15/20*    (2011.01)
*G06F 3/033*    (2013.01)
(Continued)

(52) U.S. Cl.
CPC ................ *G06T 15/20* (2013.01); *A63F 9/24* (2013.01); *A63F 13/285* (2014.09); *G06F 3/033* (2013.01);
(Continued)

(58) Field of Classification Search
None
See application file for complete search history.

(56) References Cited

U.S. PATENT DOCUMENTS

D376,826 S    12/1996   Ashida
D391,998 S    3/1998    Jwo
(Continued)

FOREIGN PATENT DOCUMENTS

KR    1020070099949    10/2007

OTHER PUBLICATIONS

Anonymous: "Razer Hydra—Wikipedia, the free encyclopedia," Oct. 21, 2011, XP055258604, Retrieved from the internet: URL: https://en.wikipedia.org/w/index.php?title=Razer_Hydra&oldid=456739291 [retrieve Mar. 15, 2016], 3 pages.
(Continued)

*Primary Examiner* — Michelle Chin
(74) *Attorney, Agent, or Firm* — Farjami & Farjami LLP

(57) ABSTRACT

There is provided a system for media pre-visualization. The system includes one or more motion capture sensors, a virtual digital renderer receiving sensor data from the one or more motion sensors capturing motions performed by an actor being directed by a user, and rendering the motions in a 3D virtual environment, according to the sensor data, to generate pre-visualization data including one or more shots, a display interfacing with the virtual digital renderer to receive the pre-visualization data, and displaying a pre-visualization using the pre-visualization data, and a controller interfacing with the virtual digital renderer, and while the user is directing the actor, allowing the user to navigate within the 3D virtual environment, using the pre-visualization on the display, and to modify at least one visual aspect of the one or more shots within the 3D virtual environment to generate modified pre-visualization data.

30 Claims, 13 Drawing Sheets

Related U.S. Application Data

(60) Provisional application No. 61/644,022, filed on May 8, 2012, provisional application No. 61/644,066, filed on May 8, 2012, provisional application No. 61/578,695, filed on Dec. 21, 2011.

(51) Int. Cl.
  *G06F 3/038* (2013.01)
  *A63F 13/285* (2014.01)
  *A63F 9/24* (2006.01)
  *G06T 19/00* (2011.01)

(52) U.S. Cl.
  CPC ............ *G06F 3/038* (2013.01); *G06T 19/003* (2013.01); *A63F 2300/1037* (2013.01); *A63F 2300/1043* (2013.01); *A63F 2300/8088* (2013.01)

(56) References Cited

U.S. PATENT DOCUMENTS

| | | |
|---|---|---|
| D405,835 S | 2/1999 | Goto |
| 5,893,798 A | 4/1999 | Stambolic et al. |
| D410,914 S | 6/1999 | Tyler et al. |
| 6,394,904 B1 | 5/2002 | Stalker |
| 6,614,420 B1 | 9/2003 | Han et al. |
| D517,124 S | 3/2006 | Merril et al. |
| D521,567 S | 5/2006 | Svendsen et al. |
| D541,771 S | 5/2007 | Chung |
| D545,692 S | 7/2007 | Bhavnani |
| D624,535 S | 9/2010 | Tsai et al. |
| D634,320 S | 3/2011 | Bliven et al. |
| 7,985,137 B1 | 7/2011 | Klitsner et al. |
| 8,118,680 B2 | 2/2012 | Layne, IV et al. |
| D665,461 S | 8/2012 | Ikeda et al. |
| D670,664 S | 11/2012 | Brown |
| D703,628 S | 4/2014 | Griffith |
| D703,629 S | 4/2014 | Griffith |
| D703,763 S | 4/2014 | Griffith |
| D703,764 S | 4/2014 | Griffith |
| 2002/0109680 A1 | 8/2002 | Orbanes et al. |
| 2005/0270368 A1 | 12/2005 | Hashimoto |
| 2007/0122027 A1 | 5/2007 | Kunita et al. |
| 2007/0206832 A1 | 9/2007 | Gordon et al. |
| 2008/0094358 A1 | 4/2008 | Sullivan |
| 2008/0231926 A1 | 9/2008 | Klug et al. |
| 2009/0046097 A1* | 2/2009 | Franklin ................ G06T 13/00 345/419 |
| 2009/0111670 A1 | 4/2009 | Williams |
| 2009/0324017 A1 | 12/2009 | Gordon et al. |
| 2010/0107127 A1 | 4/2010 | Han et al. |
| 2010/0211345 A1 | 8/2010 | Von Zon |
| 2010/0253676 A1 | 10/2010 | Mumbauer |
| 2011/0025562 A1 | 2/2011 | Hol et al. |
| 2011/0102424 A1 | 5/2011 | Hibbert et al. |
| 2012/0194645 A1 | 8/2012 | Fuller et al. |
| 2013/0201188 A1* | 8/2013 | Choi .................... G06T 19/006 345/420 |
| 2017/0092008 A1* | 3/2017 | Djorgovski ........... G06T 15/205 |

OTHER PUBLICATIONS

Anonymous: "Motion capture—Wikipedia, the free encyclopedia," Dec. 10, 2011, Retrieved from the internet: URL:https://en.wikipedia.org/w/index.php?title=Motion_capture&oldid=465068990 [retrieved on Oct. 23, 2015], 16 pages.

EP Application No. 12860874.2 Partial Supplementary European Search Report, dated Oct. 30, 2015, 7 pages.

European Patent Application No. 12860874.2 Extended European Search Report and Written Opinion dated Mar. 30, 2016, 15 pages.

Thibaut Weise et al., "Realtime performance-based facial animation," ACM Transactions on Graphics (TOG), ACM, vol. 30, No. 4, Article 77, Publication date: Jul. 2011, 9 pages.

G. Welch, et al., "Motion tracking: No silver bullet, but a respectable arsenal," IEEE Computer Graphics and Applications, IEEE Service Center, New York, NY, US, vol. 20, No. 6, Nov. 1, 2002, pp. 24-38.

International Application No. PCT/US2012/070536 International Search Report and Written Opinion dated Apr. 26, 2013, 8 pages.

New Zealand Application No. 719982, First Examination Report dated May 31, 2016, 2 pages.

CA Application No. 2859200 Office Action dated Oct. 25, 2018, 6 pages.

* cited by examiner

SYSTEM, METHOD AND APPARATUS FOR MEDIA PRE-VISUALIZATION

CROSS REFERENCE TO RELATED APPLICATIONS

This present application is a continuation-in-part of and claims priority from U.S. application Ser. No. 13/466,522 filed May 8, 2012, which claims priority to U.S. Provisional Patent Application Ser. No. 61/578,695 filed Dec. 21, 2011, U.S. Provisional Patent Application Ser. No. 61/644,022 filed May 8, 2012, and U.S. Provisional Patent Application Ser. No. 61/644,066 filed May 8, 2012, the entire contents of each of which are specifically incorporated by reference herein.

TECHNICAL FIELD

This invention relates generally to pre-visualization of film, e.g. feature films. More particularly, this invention relates to methods, systems and apparatuses for rapid, near real-time or real-time pre-visualization of films.

BACKGROUND OF THE INVENTION

Pre-visualization is a technique whereby a script or storyline is rendered into one or more images representative of that script or storyline. Traditional methods involved the generation of comics, storyboards, proposed frame sketches, etc., by an artist reading the script in an attempt to capture a writer's or director's vision. More recently, computer animation, possibly even using motion capture technologies with an actor or stuntman, have been used to produce proposed pre-visualizations for later review by a director.

However, a common problem with all of these approaches is the fact that all of these pre-visualization activities are merely attempts by others to capture the vision (action, style of the shot, etc.) of a director on a scene by scene director. While a director or producer might review a script with a traditional pre-visualization team prior to generation of the pre-visualization materials, it is a common problem that the end result is not what a director or producer ultimately wants. This may be on the level of disliking one particular action sequence, not liking a series of pans or angles on some or all of the pre-visualization materials, or simply not liking the feel of the pre-visualization materials.

Dislike of the pre-visualization materials by a director or producer sends a pre-visualization team back to the drawing boards for generating second (or multiple) attempts to capture the vision of the director before the film can move forward. Accordingly, this process is expensive and inaccurate, involving many artists and/or animators over a several weeks or months, before further production can proceed. Additionally, because the creative vision of the producers and directors was not ongoing in the animators' process, all this work might be scrapped when the final product was shared with the Studio, exec producers or the director.

Also, in general, motion capture of live performance in real time has also been extremely inefficient and expensive. For example, in the making of the film AVATAR, James Cameron's LightStorm production company developed a filming system and process requiring; costly, tethered light reflective mo-cap suits, a huge (warehouse sized) volume filled with IR cameras and HD cameras, and a heavy and bulky virtual hand-held, tethered camera wielded by the director (weighing approximately 35 lbs). The footage secured within that virtual camera was limited artistically to a camera lens view of the action, and the walking distance of the director. Additionally, the actual actors whose performances were necessary for the production spent months on call and on set to pre-capture their contributions to the film, thus further representing huge financial and time expenses. Because of these limitations, the captured footage was actual final film footage (which would have been captured after the pre-visualization stage).

Accordingly, there is a need in the art for an improved system, method and apparatus for rapid film pre-visualization that avoids the above described problems and disadvantages.

SUMMARY

The above described and other problems and disadvantages of the prior art are overcome and alleviated by the present system, method and apparatus for rapid film pre-visualization, including a motion capture component, a virtual digital rendering component configured to receive data from the motion sensors and to render motion in a three dimensional virtual environment, a controller component configured to allow a director to navigate within the three dimensional virtual environment to control the visual aspects of one or more shots within the three dimensional virtual environment, and a director's station providing a modification point of a data pipeline input to the director's station, the data pipeline input comprising data from data capture through virtual digital rendering.

In exemplary embodiments, a user (e.g., a director) can navigate through the space in real time to generate pre-visualizations according to the user's preference or vision. Exemplary embodiments allow for rough pre-visualizations, e.g. using MAYA as the virtual digital rendering component to output flat shaded blasts for approval. Other exemplary embodiments allow for more developed pre-visualizations, e.g., using an engine such as CRYENGINE 3 to provide development (e.g., virtual terrain, etc.) to the three dimensional virtual space defined by the pre-visualization process.

Also in exemplary embodiments, the controller may be a handheld device incorporating a screen along with one or more hand controllers, wherein the hand controllers are configured to provide navigation in the three dimensional virtual space and to provide film camera controls, such as pan, tilt, zoom, etc. In one particular exemplary embodiment, at least one hand control includes a navigation control that provides six degrees of movement within the three dimensional virtual space (for reference, the "SpaceNavigator" from 3dConnexion provides six degrees of motion control). In exemplary embodiments, the controller's physical position and positional changes are tracked via a magnetic field, e.g., such as is done with the Razer Hydra system in video gaming, to provide additional navigation functionality to the controller. In other embodiments, rather than using a controller hand component similar the "SpaceNavigator", two hand controllers similar to the Razer Hydra controller may be interconnected by a bar. In any of the controller embodiments, a screen or viewfinder may or may not be used (e.g., mounted on a bar extending between left and right hand controller units), according to the preference of the user.

In other exemplary embodiments, the motion capture component utilizes plural radio frequency (RF) detectors in a motion grid (an exemplary motion grid may contain, e.g., nine RF detectors and head and foot tags, which facilitate removing drift inherent in the system). An exemplary system includes an XSENS system, including such a motion grid and MVN suits (which include accelerometers therein). An exemplary system for interfacing with the virtual digital rendering component (e.g., MAYA) includes an IKinema system, which generates 'stick figures' from the positional data emitted by accelerometers in the suit(s). In exemplary embodiments, the virtual digital rendering component (e.g., MAYA), provides the environment framework for generating characters in a virtual three dimensional space.

In other exemplary embodiments, a motion capture component detects the position of and motion of the face of a performer. In one such exemplary embodiment, a performer wears an infrared camera on a head rig pointing back at the face of the performer. Information from the facial capture may be fed into a virtual digital rendering component (e.g., MAYA), either alone or in addition to the exemplary motion capture (utilizing performer worn suits) described above. Subsequent pre-visualization processing of the data may then be performed by a director or animator, either in real time with the motion capture or subsequent to any motion capture.

According to some or all of the above exemplary embodiments, the present invention thus provides systems, methods and apparatuses that provide fast pre-visualization for films utilizing control input, such as input from a director, to shape the pre-visualization. Thus, exemplary embodiments might provide a system where performers (actors, stuntmen, etc.) wearing wireless suits are choreographed in real time by a film's director. The director can sit in front of a display that shows the output of the captured motion in a three dimensional virtual environment and can both navigate and shape the visual shot within the three dimensional virtual environment according to the director's taste and vision. The pre-visualizations can be output in basic form (e.g., flat shaded blasts) or within a virtual world generated from an engine, such as the CRYENGINE 3, UNREAL engine, etc. The pre-visualizations can be generated on-set with the motion capture and with the director, in addition to the data being subsequently available (after motion capture) for off-set variations.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGURES.

DETAILED DESCRIPTION

Figure 1:
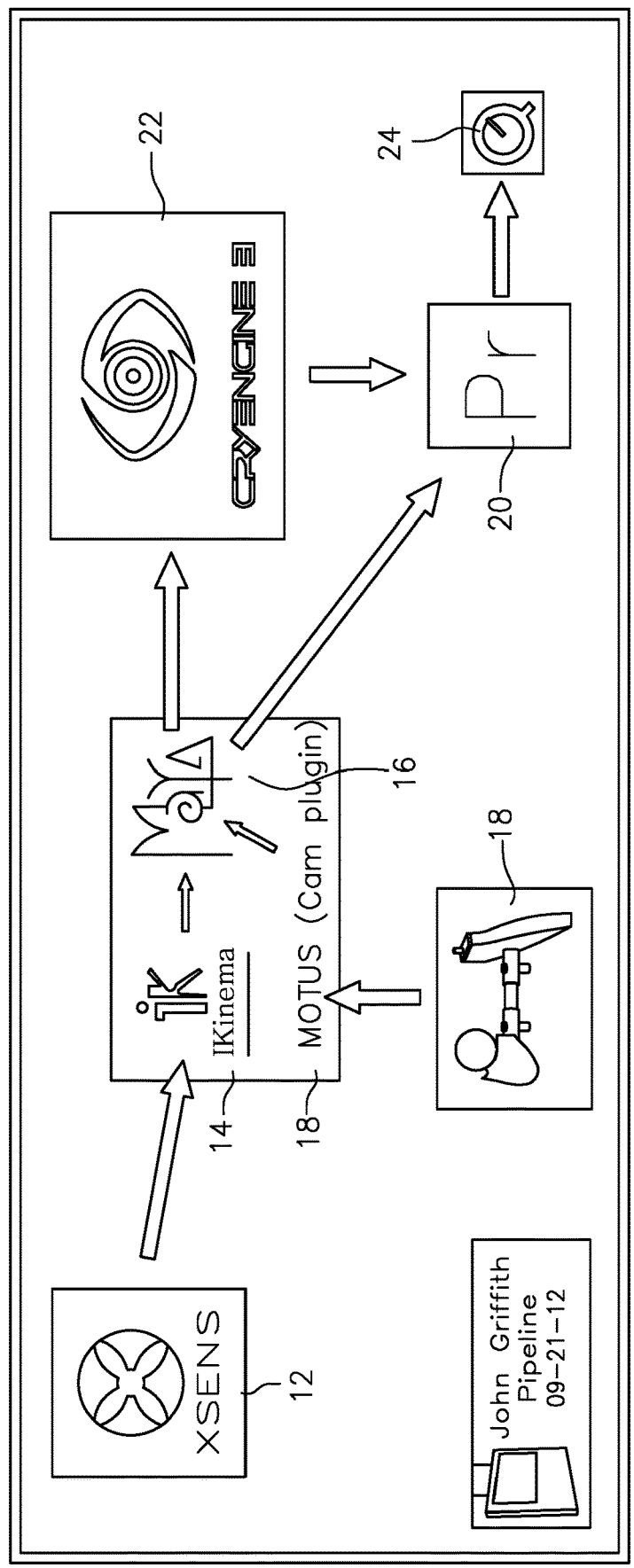
FIG. 1 illustrates an exemplary flowchart for rapid film pre-visualization.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the terms "photo," "photograph," "image," or any variation thereof may be interchangeable. Thus, any form of graphical image may be applicable to example embodiments.

It will also be understood that the terms "audio," "audio tracks," "music," "music tracks," or any variation thereof may be interchangeable. Thus any form of audio may be applicable to example embodiments.

It will also be understood that the terms "film," "media," "multi-media," "video," or any variation thereof may be interchangeable. Thus any form of rich media may be applicable to example embodiments.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

As described herein, example embodiments of the present invention may include systems, methods and apparatus for rapid film pre-visualization, including a motion capture component interfacing with wearable motion capture sensors; a virtual digital rendering component configured to receive the captured motion and re-create such motion in a three dimensional virtual space; a display component configured to display an output of the virtual digital rendering component; and a controller component, configured to interface with the virtual digital rendering component and allow a user to navigate within the three dimensional virtual space to control the visual aspects of one or more shots within the three dimensional virtual space.

In exemplary embodiments, a user (e.g., a director) can navigate through the space in real time to generate pre-visualizations according to the user's preference or vision. Exemplary embodiments allow for rough pre-visualizations, e.g. using MAYA as the virtual digital rendering component to output flat shaded blasts for approval. Other exemplary embodiments allow for more developed pre-visualizations, e.g., using an engine such as CRYENGINE 3 to provide development (e.g., virtual terrain, etc.) to the three dimensional virtual space defined by the pre-visualization process.

Also in exemplary embodiments, the controller may be a handheld device incorporating a screen along with one or more hand controllers, wherein the hand controllers are configured to provide navigation in the three dimensional virtual space and to provide film camera controls, such as pan, tilt, zoom, etc. In one particular exemplary embodiment, at least one hand control includes a navigation control that provides six degrees of movement within the three dimensional virtual space (for reference, the "SpaceNavigator" from 3dConnexion provides six degrees of motion control). In exemplary embodiments, the controller's physical position and positional changes are tracked via a magnetic field, e.g., such as is done with the Razer Hydra system in video gaming, to provide additional navigation functionality to the controller. In other embodiments, rather than using a controller hand component similar the "SpaceNavigator", two hand controllers similar to the Razer Hydra controller may be interconnected by a bar. In any of the controller embodiments, a screen or viewfinder may or may not be used (e.g., mounted on a bar extending between left and right hand controller units), according to the preference of the user.

In other exemplary embodiments, the motion capture component utilizes plural radio frequency (RF) detectors in a motion grid (an exemplary motion grid may contain, e.g., nine RF detectors and head and foot tags, which facilitate removing drift inherent in the system). An exemplary system includes an XSENS system, including such a motion grid and MVN suits (which include accelerometers therein). An exemplary system for interfacing with the virtual digital rendering component (e.g., MAYA) includes an IKinema system, which generates 'stick figures' from the positional data emitted by accelerometers in the suit(s). In exemplary embodiments, the virtual digital rendering component (e.g., MAYA), provides the environment framework for generating characters in a virtual three dimensional space.

In other exemplary embodiments, a motion capture component detects the position of and motion of the face of a performer. In one such exemplary embodiment, a performer wears an infrared camera on a head rig pointing back at the face of the performer. Information from the facial capture may be fed into a virtual digital rendering component (e.g., MAYA), either alone or in addition to the exemplary motion capture (utilizing performer worn suits) described above. Subsequent pre-visualization processing of the data may then be performed by a director or animator, either in real time with the motion capture or subsequent to any motion capture.

Figure 13:
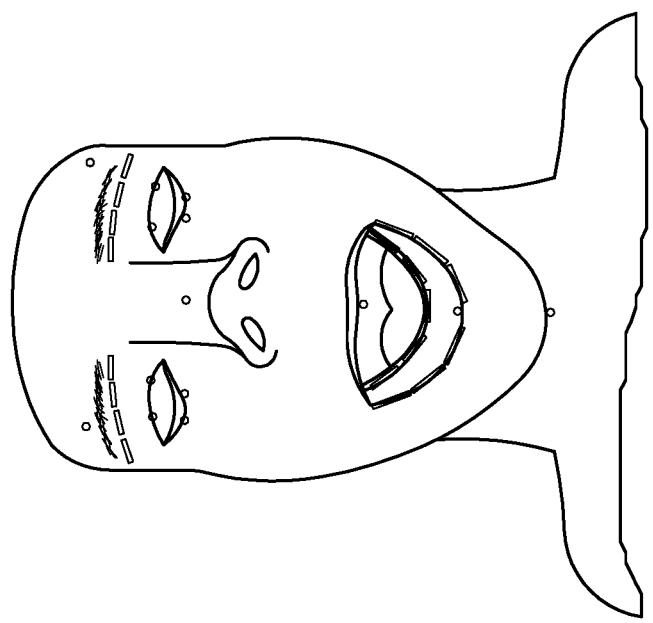
FIG. 13 illustrates an exemplary facial capture process.
Figure 13:
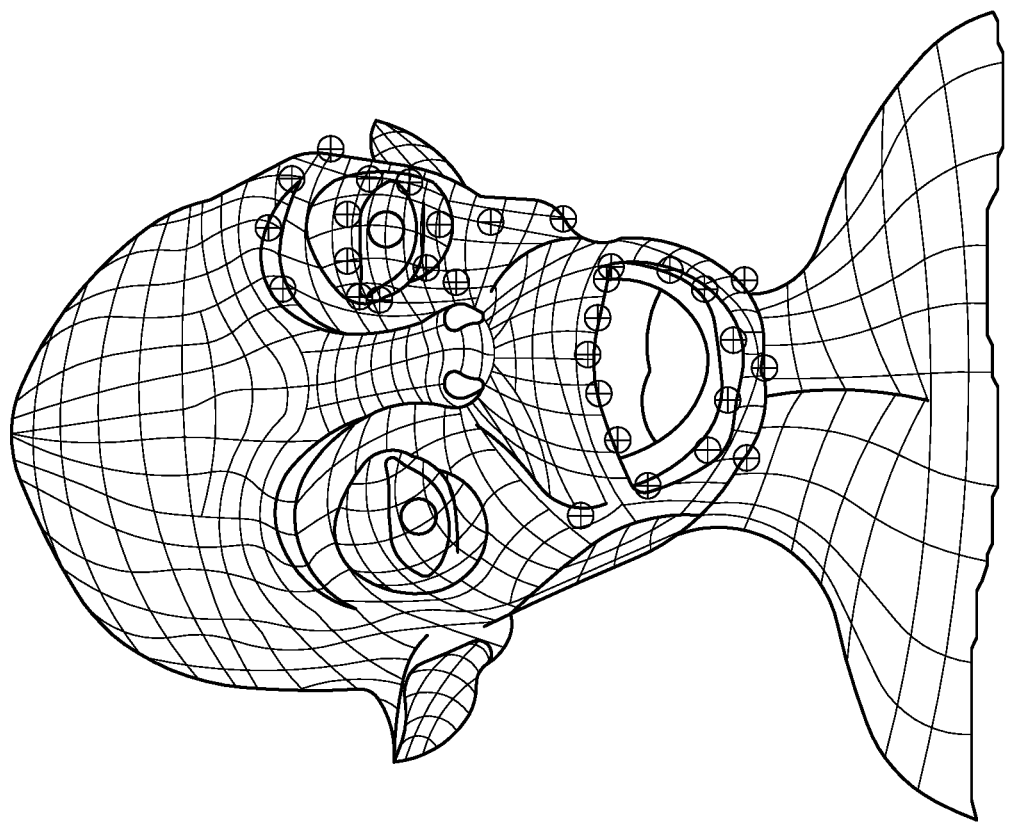

Exemplary facial capture procedures in accordance with the above follow: An exemplary process begins with an actor or stunt professional wearing a motion capture suit with an infrared camera on a head rig pointing back at the face of the actor or stunt professional. The infrared camera technology could be wireless or could have the camera wired into a computer that is configured to capture a performance as a file (e.g., as a Quick Time file). Additionally, the system could be configured to use facial markers for such capture (utilizing placement of key readable markers physically placed directly on the actors/stunt performers faces); or the system can be marker-less, e.g., similar to the Motek system illustrated at http://www.motekentertainment.com/index.php?option=com_content&task=view&id=17&Itemid=67. Reference is also made to FIG. 13, which illustrates an example of such facial capture utilized by the Motek Company.

In a further exemplary process, the actor or stunt performer runs through a broad range of facial expressions. This enables the software within the facial capture system to 'understand' the actor's or stunt performer's features. At this juncture, the facial expressions may be recorded in a convenient file format, e.g., a Quick Time video. This recording may be fed into a suitable virtual digital rendering component, e.g. a MAYA system, along with any information secured from the actor's or stunt performer's physical movements, e.g. as detected by mo-cap suits.

Additionally or alternately, information from a bone driven face rig may be fed into the virtual digital rendering component for the geometry and topography of the actor's or stunt performer's face. The movements of the facial features captured by the infrared camera and recorded as a video file may then be fed into a plug-in (i.e., a plug-in supporting such bone driven face rig that is configured to feed into the virtual digital rendering component) tied to the bone driven rig, so that the face appears within normal human parameters.

In exemplary embodiments, the data streams from both the mo-cap suit regarding the physical placement of the actor's or stunt performer's body in time and space and the data stream from the facial capture infrared camera which provides input about the facial expression upon the actor's or stunt performer's face during performance can be processed through the pre-visualization system described herein. These data streams enable the director or animator to effectively pre-visualize a scene from both the actor's or stunt performer's actions and facial expressions within an established environment in a cry-engine/sandbox. Utilizing the virtual camera and overall pre-visualization system, the dual data streams of physical movement, body placement in time and space and facial expression expressed during those movements can be edited and re-edited into a seamless action sequence.

While the above example describes pre-recording of an actor's performance, it should be recognized that such pre-recording is not necessary, if desired. In one such example, a performance can be fed from a camera directly to a bone based rig and driven in real time.

According to some or all of the above exemplary embodiments, the present invention thus provides systems, methods and apparatuses that provide fast pre-visualization for films utilizing control input, such as input from a director, to shape the pre-visualization. Thus, exemplary embodiments might provide a system where performers (actors, stuntmen, etc.) wearing wireless suits are choreographed in real time by a film's director. The director can sit in front of a display that shows the output of the captured motion in a three dimensional virtual environment and can both navigate and shape the visual shot within the three dimensional virtual environment according to the director's taste and vision. The pre-visualizations can be output in basic form (e.g., flat shaded blasts) or within a virtual world generated from an engine, such as the CRYENGINE 3, UNREAL engine, etc. The pre-visualizations can be generated on-set with the motion capture and with the director, in addition to the data being subsequently available (after motion capture) for off-set variations. Further, due to the relatively small size of various components, the present system provides a portable capture, processing and pre-visualization system that permits easy relocation and use in office type settings.

Hereinafter, example embodiments of the present invention are described in detail.

Turning to FIG. 1, a flowchart of an exemplary system includes a motion capturing component 12, shown here as an XSENS system, including such a motion grid and MVN suits (which include accelerometers therein). The present inventors have also modified the suits with attachment points for harnesses via reinforced holes and reinforced accelerometers.

An exemplary system for interfacing with the virtual digital rendering component 16 (e.g., MAYA) includes an IKinema system 14, which generates 'stick figures' from the positional data emitted by accelerometers in the suit(s). In exemplary embodiments, the virtual digital rendering component 16 (e.g., MAYA), provides the environment framework for generating characters in a virtual three dimensional space. While the following portions of the specification specifically refer to various specific systems, such as XSENS, IKinema, MAYA, CRYENGINE 3, Adobe, etc., it should be recognized that they are merely exemplary systems, and other systems may be used within the basic framework of the invention.

Referring still to FIG. 1, in exemplary embodiments, a controller 18 acts as a virtual camera within the framework provided by MAYA 16 via a virtual camera plugin 18. Generated pre-visualization may then be output simply, e.g., as flat shaded blasts, for approval, or with additional detail, such as a virtual world provided by an engine 22 such as CRYENGINE 3. This additional detail may be provided with the MAYA or MAYA/CINEBOX data for display to the director so that the director receives an immersive image (even to the level of detail representative of actual film production) for use of the virtual camera controller to direct action. Once a pre-visualization is considered satisfactory (at 20), it may further be exported as a known or common format for storage (at 24).

Figure 2:
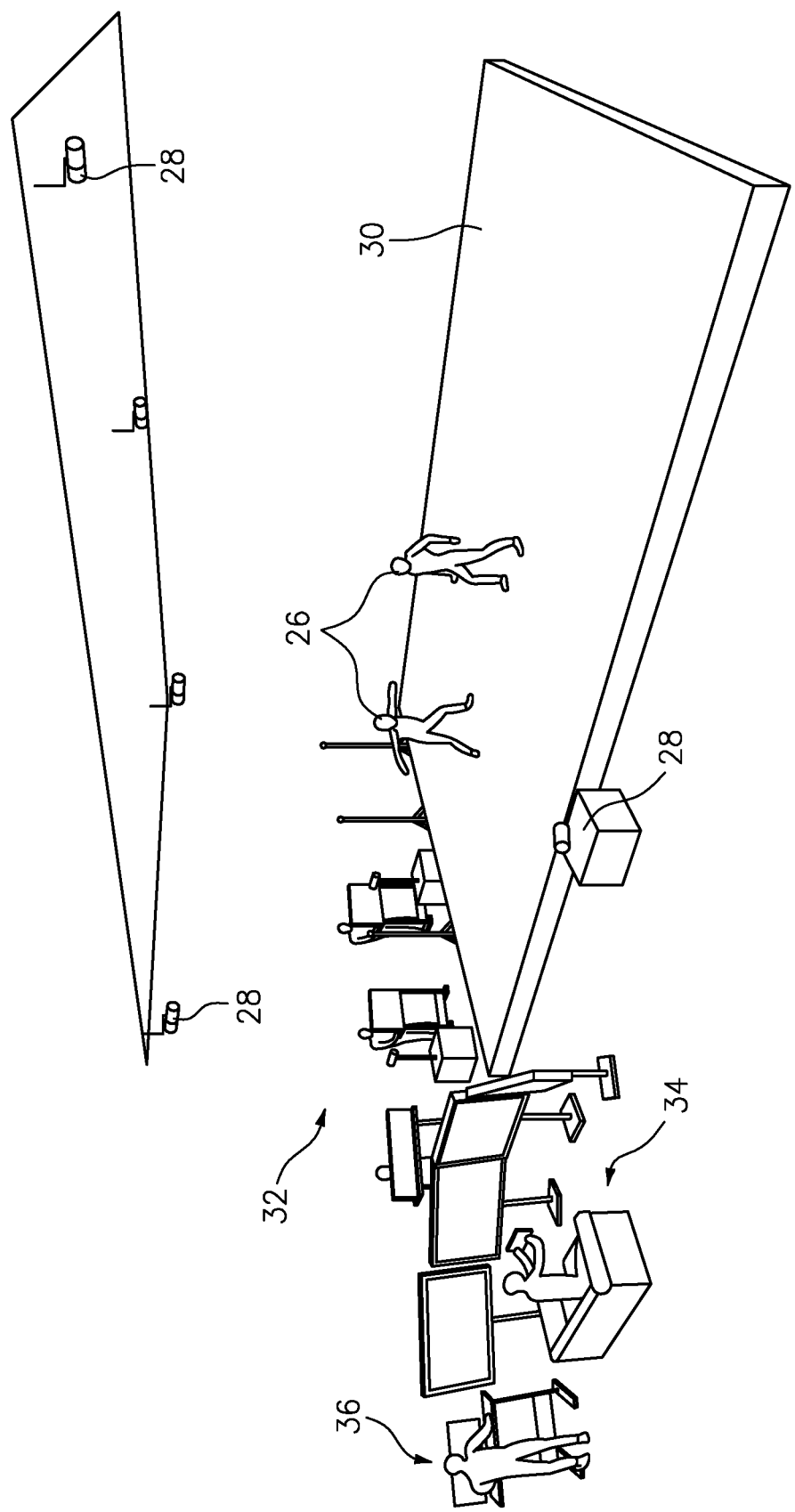
FIG. 2 illustrates a perspective view of an exemplary pre-visualization setup in accordance with the present disclosure.

Referring now to FIG. 2, an exemplary diagram of a set including exemplary aspects of the present invention is shown in perspective. An XSENS motion capture system is illustrated, including performers in motion sensing suits 26. The XSENS system includes RF detectors 28, which detect motion of the suits on a stage 30. Various terminals, shown generally at 32, are also illustrated for motion capture and three dimensional virtual environment rendering. An exemplary director's area 34 and exemplary directed image processing area 36 are also generally illustrated, but will be described in more detail below.

Figure 3:
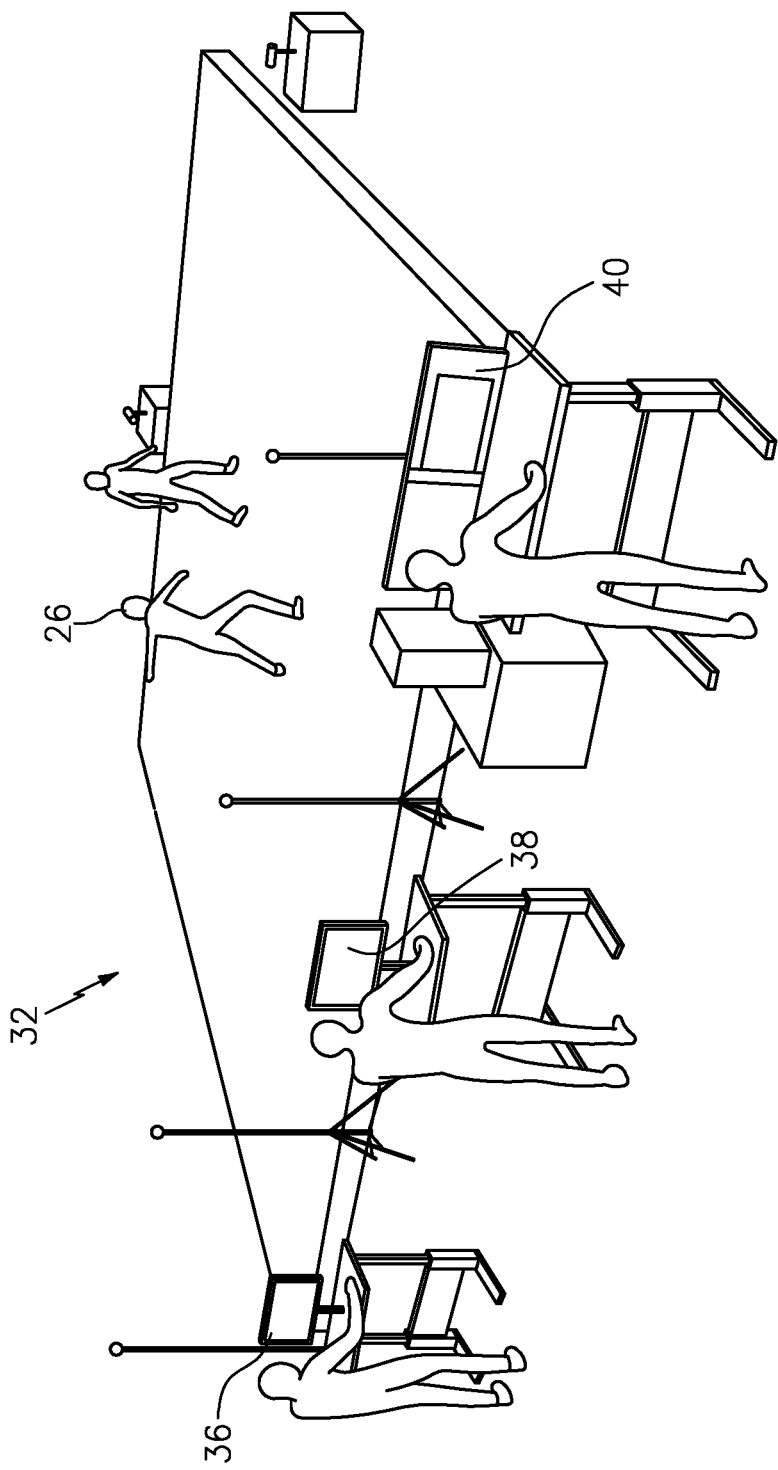
FIG. 3 illustrates a perspective view of an exemplary setup for data capture and processing of data into a three dimensional virtual environment.

Referring now to FIG. 3, an exemplary motion capture and virtual environment rendering terminals are generally shown at 32. A first exemplary terminal 36 (labeled as a MVN Studio) captures data from the suits 26. A second exemplary terminal 38 (labeled as MAYA TD) renders the captured data into a three dimensional virtual environment. A third exemplary terminal 40 (labeled as MAYA/CINEBOX AD) provides an optional image enhancement, such as rendering the captured motion for a given suit a specific character for viewing by the director or other user.

Figure 4:
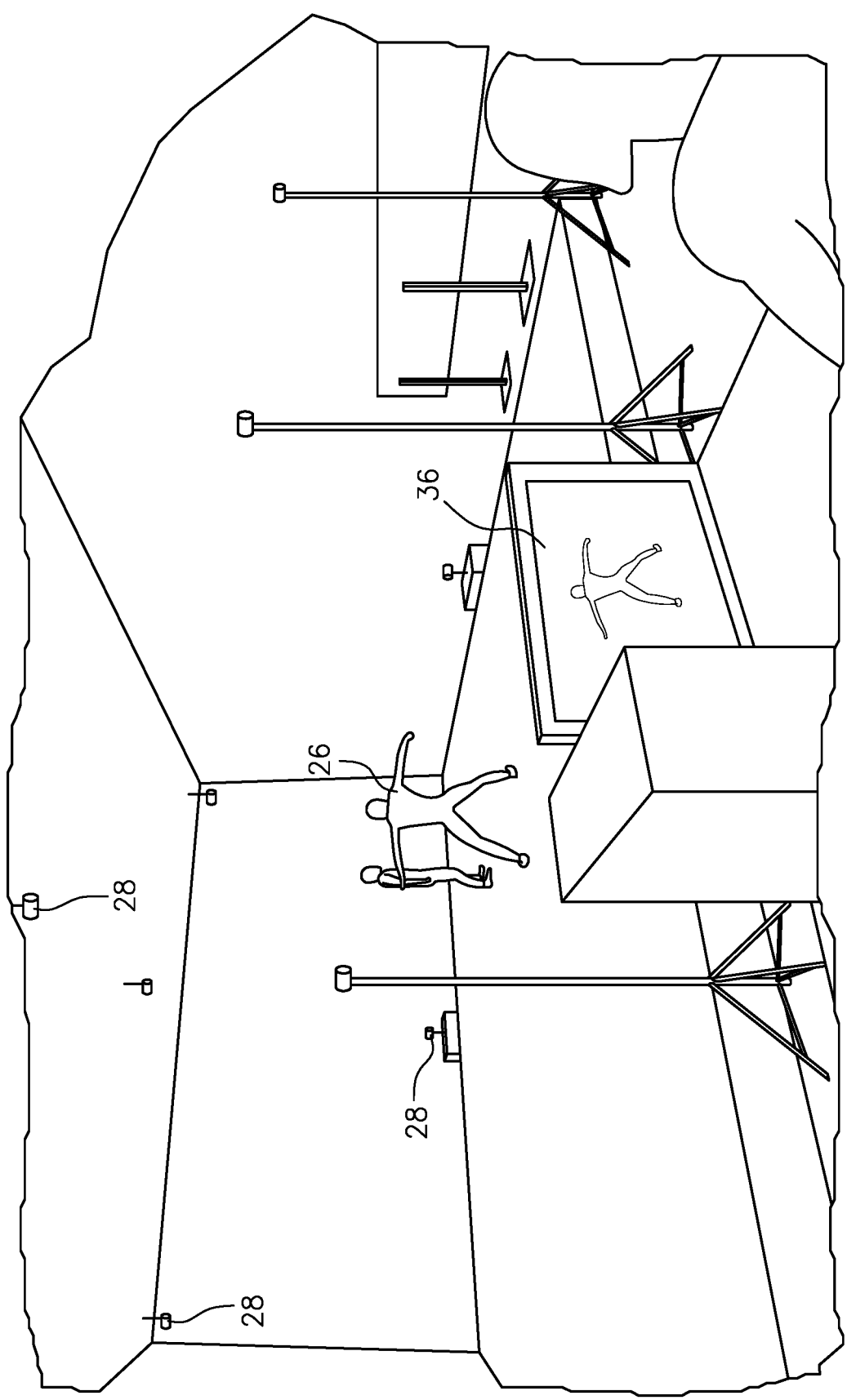
FIG. 4 illustrates a perspective view of an exemplary setup for data capture.

FIG. 4 further shows exemplary capture of data within the MVN motion grid (including the RF detectors 28) of position and motion of the MVN suits 26 at the MVN Studio terminal 36.

Figure 5:
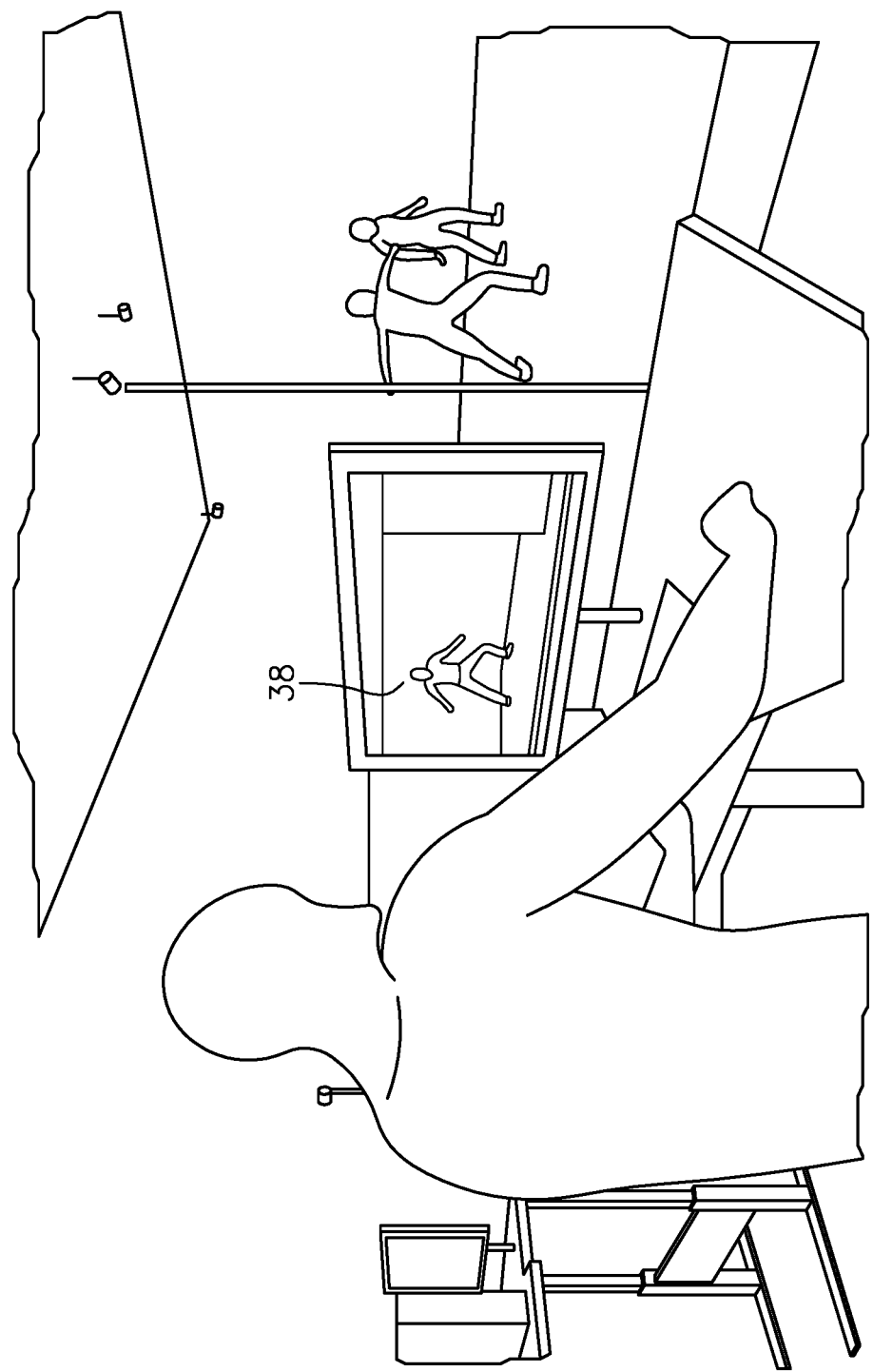
FIG. 5 illustrates a perspective view of an exemplary setup for processing of data into a three dimensional virtual environment.

FIG. 5 further shows exemplary conversion of the "stick figure" information into character information at the MAYA TD terminal 38.

Figure 6:
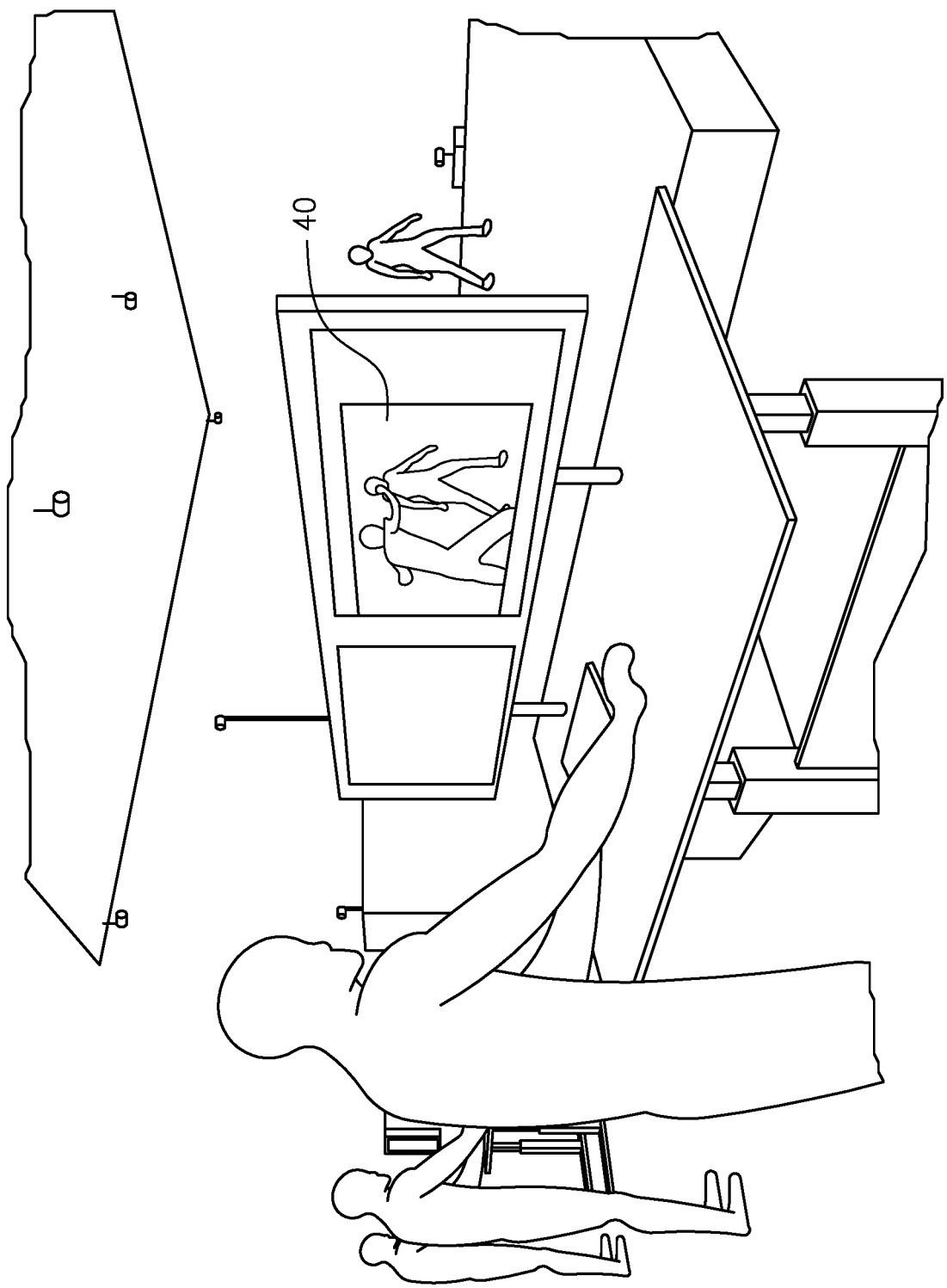
FIG. 6 illustrates a perspective view of an exemplary setup for processing of data into a three dimensional virtual environment.

FIG. 6 shows exemplary and optional additional shading or stereoscopic processing of the MAYA image at the MAYA/CINEBOX AD terminal 40.

Figure 7:
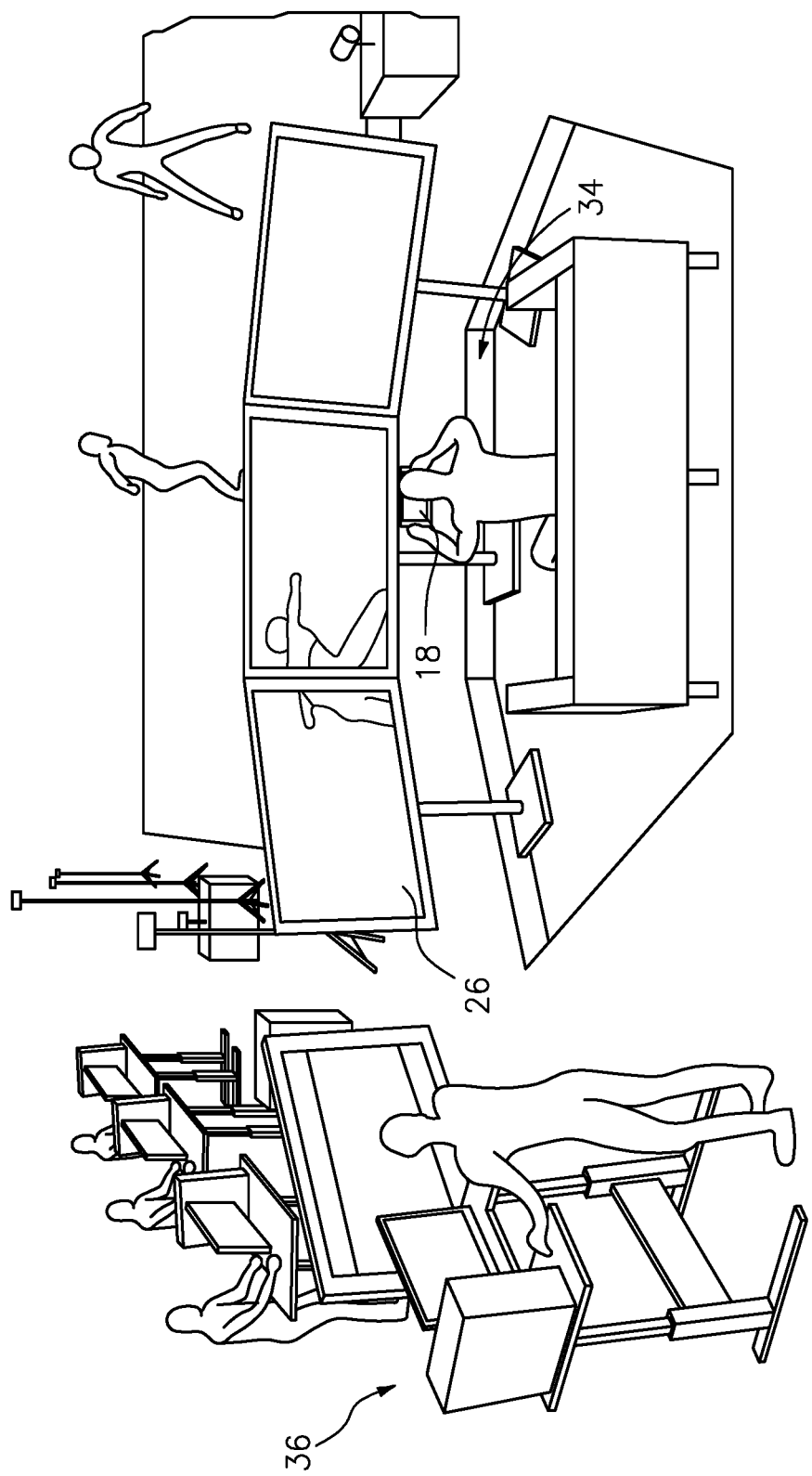
FIG. 7 illustrates a perspective view of an exemplary setup for a director's environment and an environment for processing directed material.

FIG. 7 shows an exemplary director's area 34 and an exemplary directed image processing area 36 together as a "virtual village." The exemplary director's area 34 includes a controller 18 that acts as a director's virtual camera in the virtual environment and a multi-panel set view 42 to immerse the director in the virtual environment while directing the camera action. The exemplary directed image processing area 36 (labeled in FIG. 7 as Adobe Premiere) includes software to edit the director's virtual shots.

Figure 8:
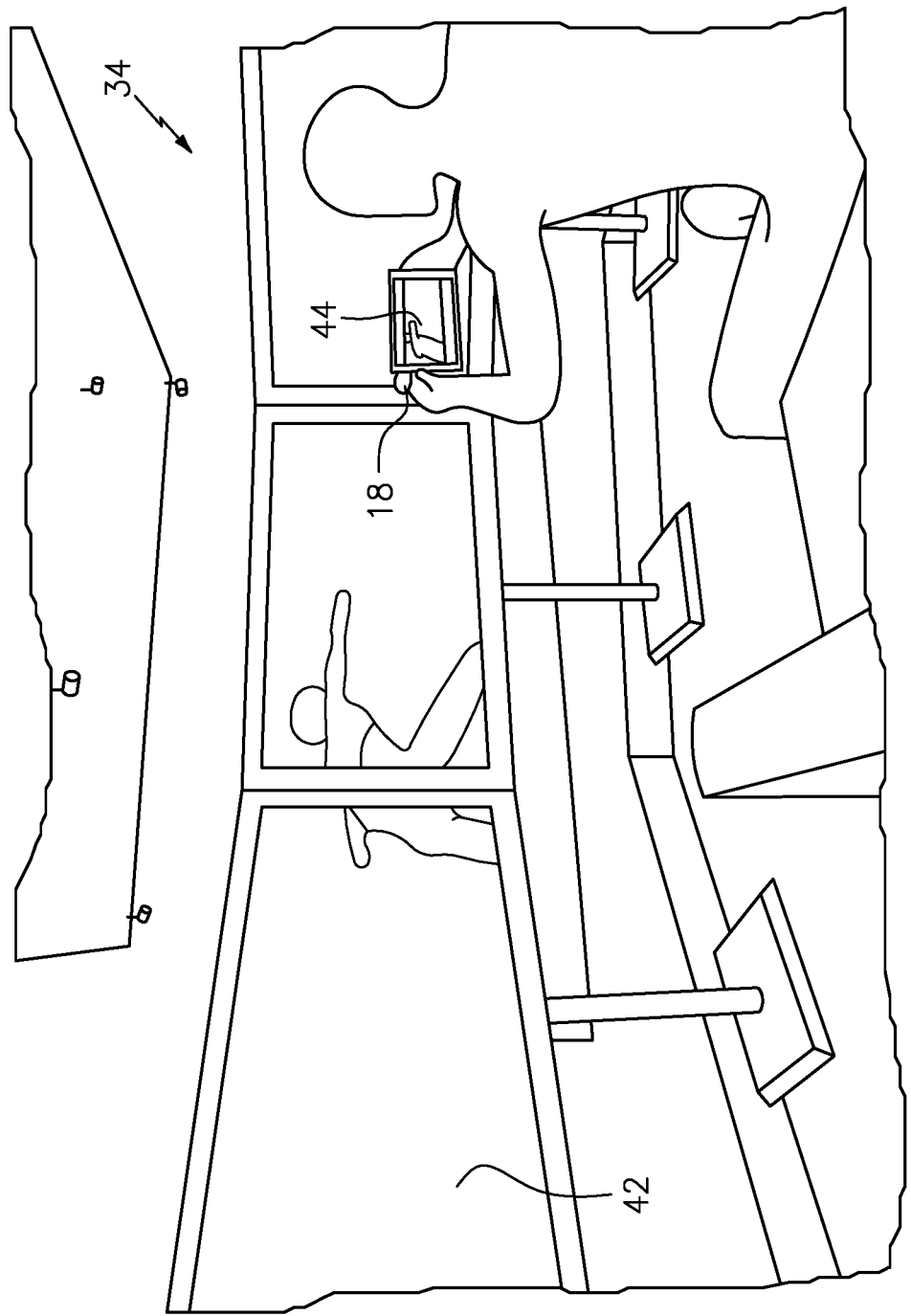
FIG. 8 illustrates a perspective view of an exemplary setup for a director's environment.

FIG. 8 illustrates the director's area 34 in more detail, including the exemplary multi-panel set view 42 and an exemplary handheld controller 18 with an integrated screen 44 imitating a camera's viewfinder.

Figure 9:
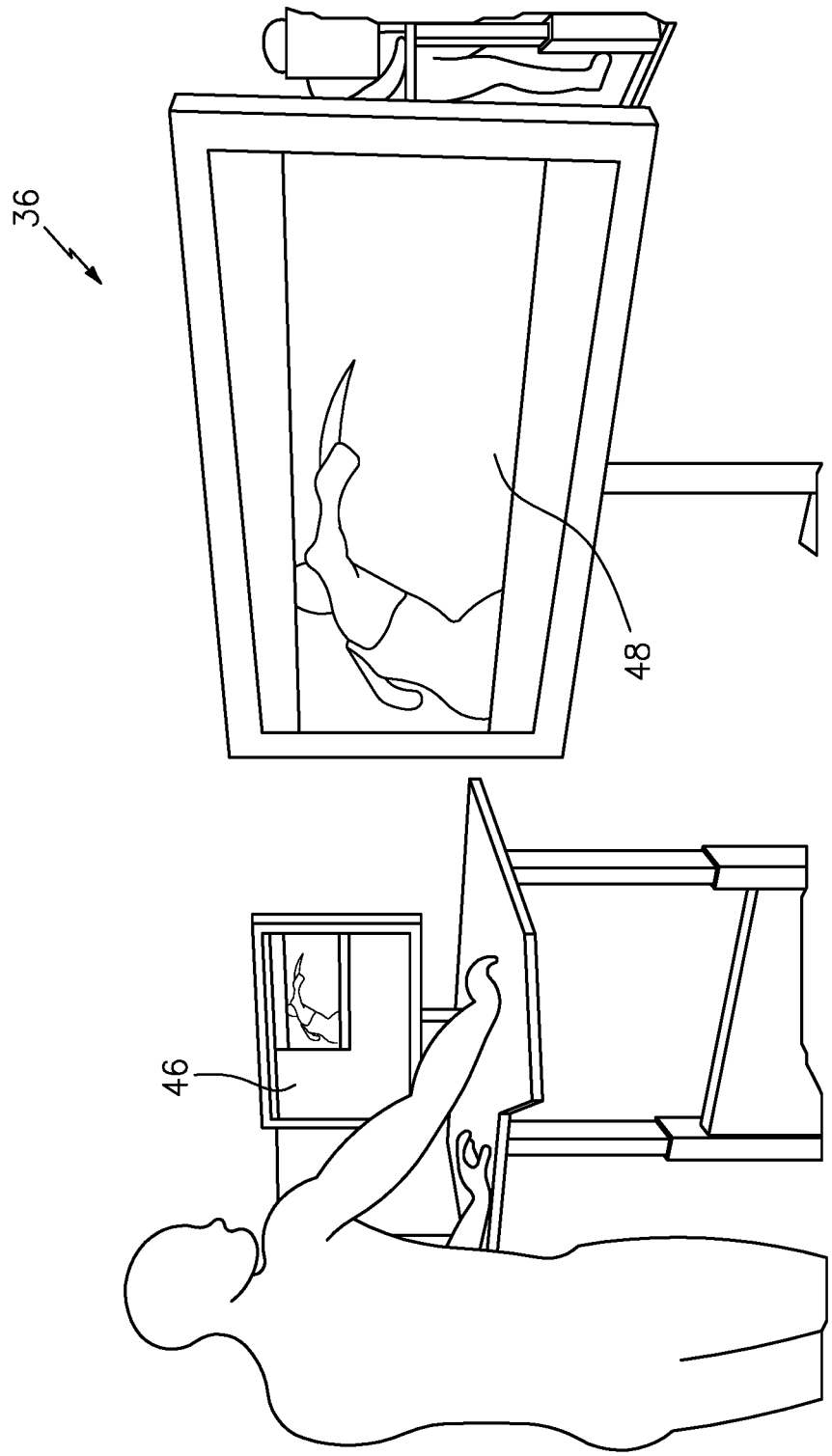
FIG. 9 illustrates a perspective view of an exemplary setup for an environment for processing directed material.

FIG. 9 similarly illustrates the directed image processing area 36 in more detail, showing an editing interface 46 and a display 48 showing the finished editing product.

Figure 10:
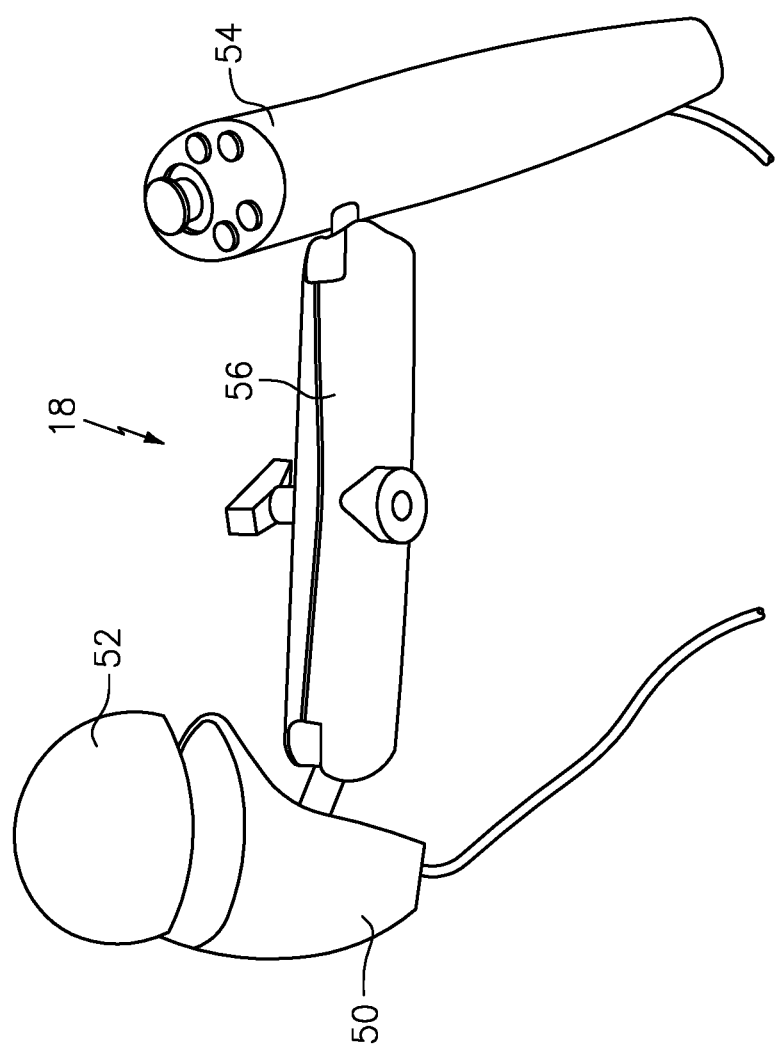
FIG. 10 illustrates an exemplary controller.
Figure 12:
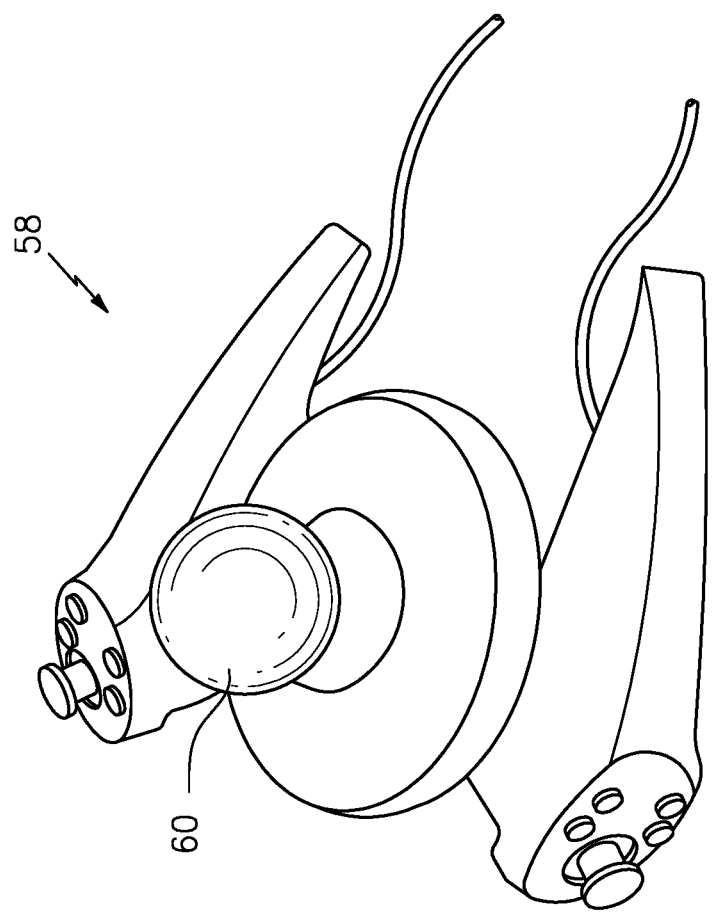
FIG. 12 illustrates a standard Razer Hydra controller.

FIG. 10 illustrates an exemplary controller 18 that acts as a virtual camera for a director. The exemplary controller includes a first handheld portion 50, which is configured with a navigation toggle 52 having six degrees of motion. The illustrated exemplary first handheld portion 50 is a modified controller with a toggle portion from a "Space-Navigator" product made by 3dConnexion. A second handheld controller 54 is tethered to the first handheld controller 50 by an adjustable bar 56. The illustrated exemplary second handheld controller 54 is derived from a Razer Hydra control system (which is shown generally at 58 in FIG. 12). In exemplary embodiments, the illustrated system would also make use of the magnetic Orb Controller (60 in FIG. 12) from the Hydra kit.

Figure 11:
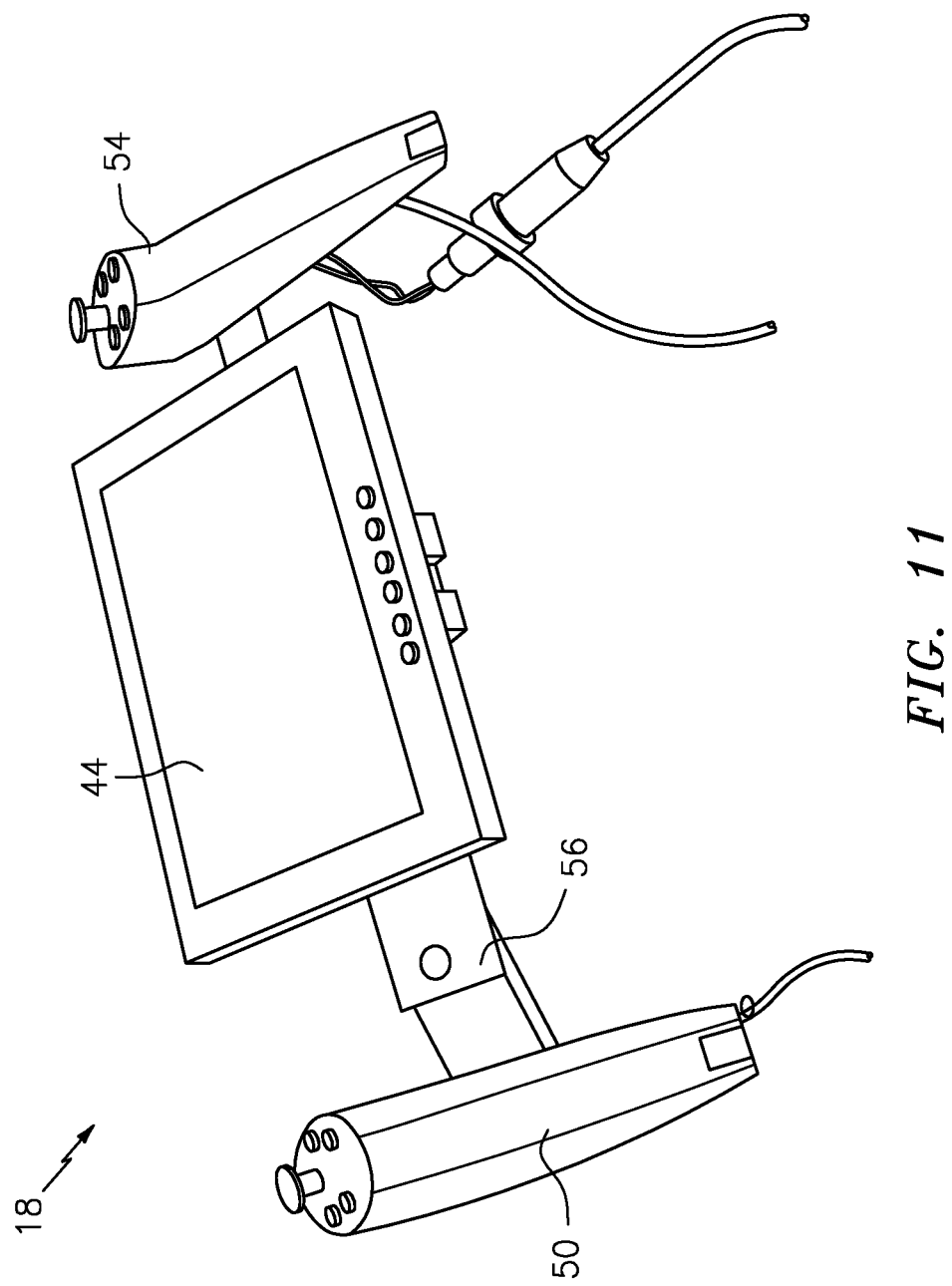
FIG. 11 illustrates another exemplary controller including a virtual camera viewfinder screen.

FIG. 11 shows another exemplary controller 18. This exemplary controller includes first 50 and second 54 handheld controllers (with the first optionally configured as a Razer Hydra controller), a connection bar 56, and a video screen 44 (also shown in FIG. 8) that is configured to act as a virtual viewfinder for a director or user.

It should be emphasized that the above-described example embodiments of the present invention, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. For example, the present invention should not be construed as being limited to a pre-visualization setting, since it should be recognized that the ability to direct via the controller captured action in a three dimensional virtual environment may be equally applicable to capture of finished film shots as to capture of shots for pre-visualization of films. All such modifications and variations are intended to be included herein within the scope of this disclosure and the present invention and protected by the following claims.

What is claimed is:

1. A system for media pre-visualization, the system comprising:
   one or more motion capture sensors;
   a virtual digital renderer configured to:
      receive sensor data from the one or more motion sensors capturing motions performed by an actor being directed by a user; and
      render the motions in a three-dimensional virtual environment, according to the sensor data, to generate pre-visualization data including one or more shots;
   a display configured to:
      interface with the virtual digital renderer to receive the pre-visualization data; and
      display a pre-visualization using the pre-visualization data received from the virtual digital renderer;
   a controller configured to:
      interface with the virtual digital renderer; and
      while the user is directing the actor performing the motions being captured using the one or more motion capture sensors, allow the user to navigate within the three-dimensional virtual environment, using the pre-visualization displayed on the display, and to modify at least one visual aspect of the one or more shots of the pre-visualization data within the three-dimensional virtual environment to generate modified pre-visualization data.

2. The system in accordance with claim 1, wherein the one or more motion sensors include at least one RF detector configured to detect an accelerometer in a wearable suit worn by the actor within an RF grid.

3. The system in accordance with claim 1, wherein the virtual digital renderer comprises a MAYA platform.

4. The system in accordance with claim 1, wherein the controller is further configured to act as a virtual camera in the three-dimensional virtual environment.

5. The system in accordance with claim 4, wherein the virtual camera is configured to navigate within the three-dimensional virtual environment.

6. The system in accordance with claim 4, wherein the controller includes camera controls configured to control pan, tilt and zoom of the virtual camera.

7. The system in accordance with claim 6, further comprising:
   a view screen coupled to the controller, the view screen configured to act as a virtual viewfinder for the virtual camera.

8. The system in accordance with claim 1, wherein the controller includes a handheld remote that is sensitive to a reference magnetic field to provide real-time positional information about the controller relative to the reference magnetic field.

9. The system in accordance with claim 1, wherein the controller is configured to navigate as a virtual camera in the three-dimensional virtual environment in real-time for the user to view the pre-visualization.

10. The system in accordance with claim 1, wherein the virtual digital renderer is further configured to render one or more flat-shaded blasts in the three-dimensional virtual environment.

11. The system in accordance with claim 1, wherein the virtual digital renderer is further configured to provide shading and stereoscopic processing to one or more rendered figures derived from the sensor data in the three-dimensional virtual environment.

12. The system in accordance with claim 1, wherein the virtual digital renderer is further configured to provide detail development in the three-dimensional virtual environment.

13. The system in accordance with claim 1, wherein the virtual digital renderer is further configured to provide virtual terrain in the three-dimensional virtual environment.

14. The system in accordance with claim 1, wherein the system further comprises a storage, and wherein the controller is further configured to store the modified pre-visualization data in the storage.

15. The system in accordance with claim 1, wherein the motions performed by the actor are being choreographed in real-time by the user.

16. A method of media pre-visualization comprising:
   obtaining, using one or more motion capture sensors, sensor data;
   receiving, using a virtual digital renderer, sensor data from the one or more motion sensors capturing motions performed by an actor being directed by a user; and
   rendering, using the virtual digital renderer, the motions in a three-dimensional virtual environment, according to the sensor data, to generate pre-visualization data including one or more shots;
   receiving, by a display interfacing with the virtual digital renderer, the pre-visualization data;
   displaying, using the display, a pre-visualization using the pre-visualization data received from the virtual digital renderer;
   while the user is directing the actor performing the motions being captured using the one or more motion capture sensors, allowing, using a controller interfacing with the virtual digital renderer, the user to:
      navigate within the three-dimensional virtual environment, using the pre-visualization displayed on the display, and
      modify at least one visual aspect of the one or more shots of the pre-visualization data within the three-dimensional virtual environment to generate modified pre-visualization data; and
   storing, in a storage, the modified pre-visualization data.

17. The method in accordance with claim 16, wherein the one or more motion sensors include at least one RF detector detecting an accelerometer in a wearable suit worn by the actor within an RF grid.

18. The method in accordance with claim 16, wherein the virtual digital renderer comprises a MAYA platform.

19. The method in accordance with claim 16, further comprising:
   providing, using the controller, a virtual camera in the three-dimensional virtual environment.

20. The method in accordance with claim 19, further comprising:
navigating, using the virtual camera, within the three-dimensional virtual environment.

21. The method in accordance with claim 19, wherein the controller includes camera controls controlling pan, tilt and zoom of the virtual camera.

22. The method in accordance with claim 21, further comprising:
providing, using a view screen coupled to the controller, a virtual viewfinder for the virtual camera.

23. The method in accordance with claim 16, wherein the controller includes a handheld remote that is sensitive to a reference magnetic field and provides real-time positional information about the controller relative to the reference magnetic field.

24. The method in accordance with claim 16, further comprising:
navigating, using the controller, a virtual camera in the three-dimensional virtual environment in real-time for the user to view the pre-visualization.

25. The method in accordance with claim 16, further comprising:
rendering, using the virtual digital renderer, one or more flat-shaded blasts in the three-dimensional virtual environment.

26. The method in accordance with claim 16, further comprising:
providing, using the virtual digital renderer, shading and stereoscopic processing to one or more rendered figures derived from the sensor data in the three-dimensional virtual environment.

27. The method in accordance with claim 16, further comprising:
providing, using the virtual digital renderer, detail development in the three-dimensional virtual environment.

28. The method in accordance with claim 16, further comprising:
providing, using the virtual digital renderer, virtual terrain in the three-dimensional virtual environment.

29. The method in accordance with claim 16, further comprising:
storing the modified pre-visualization data in a storage.

30. The method in accordance with claim 16, wherein the motions performed by the actor are being choreographed in real-time by the user.

* * * * *